(12) United States Patent
Wszolek et al.

(10) Patent No.: US 10,649,832 B2
(45) Date of Patent: May 12, 2020

(54) TECHNOLOGIES FOR HEADLESS SERVER MANAGEABILITY AND AUTONOMOUS LOGGING

(71) Applicant: Intel Corporation, Santa Clara, CA (US)

(72) Inventors: Kasper Wszolek, Gdansk (PL); Janusz P. Jurski, Hillsboro, OR (US); Piotr Kwidzinski, Folsom, CA (US); Robert C. Swanson, Olympia, WA (US); Madhusudhan Rangarajan, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 15/677,325

(22) Filed: Aug. 15, 2017

(65) Prior Publication Data

US 2019/0057000 A1 Feb. 21, 2019

(51) Int. Cl.
*G06F 11/00* (2006.01)
*G06F 11/07* (2006.01)

(52) U.S. Cl.
CPC ...... *G06F 11/0766* (2013.01); *G06F 11/0772* (2013.01); *G06F 11/0778* (2013.01); *G06F 11/0757* (2013.01)

(58) Field of Classification Search
CPC ............. G06F 11/0766; G06F 11/0778; G06F 11/0772; G06F 11/0757; G06G 2370/24
See application file for complete search history.

(56) References Cited

U.S. PATENT DOCUMENTS

| | | | | |
|---|---|---|---|---|
| 2008/0282117 A1* | 11/2008 | Partani | .................... | G06F 3/023 714/48 |
| 2012/0327094 A1* | 12/2012 | Loh | ........................ | G09G 5/003 345/501 |
| 2016/0366239 A1* | 12/2016 | Rabeela | .............. | H04L 67/2819 |
| 2017/0300371 A1* | 10/2017 | Soffer | ................. | G06F 11/0709 |
| 2017/0353347 A1* | 12/2017 | Li | ........................... | G06F 11/20 |

* cited by examiner

*Primary Examiner* — Joseph D Manoskey
(74) *Attorney, Agent, or Firm* — Barnes & Thornburg LLP (57) ABSTRACT

Embodiments of the claimed invention include a computing device having a host processor for executing a firmware environment and a manageability controller. The firmware environment reserves a frame buffer in main memory and loads a graphics protocol driver to provide the frame buffer to an operating system of the computing device. The operating system renders graphical images to the frame buffer using a graphics driver. The manageability controller reads the graphical image from the frame buffer and may transmit the graphical image to a remote computing device. In response to a fatal error of the computing device, the manageability controller may store the graphical image to a non-volatile storage device. The host processor may assert a host reset signal in response to the fatal error, and the manageability controller may send an acknowledgment to the host processor after storing the graphical image. Other embodiments are described and claimed.

22 Claims, 3 Drawing Sheets

TECHNOLOGIES FOR HEADLESS SERVER MANAGEABILITY AND AUTONOMOUS LOGGING

BACKGROUND

Server computing devices in large data centers are typically run in a headless configuration, without easy access to a local console or other human interface device (e.g., keyboard, mouse, and display). Indeed, some headless devices may not include a graphics controller or other video output hardware. For platform manageability, many server computing devices and/or server boards include out-of-band (OOB) manageability features. For example, server boards may include a board management controller (BMC) that provides keyboard, mouse, and video redirection (KVMr) services for the server device. Typical BMCs may provide KVMr services by including dedicated video graphics adapter (VGA) hardware in the BMC.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
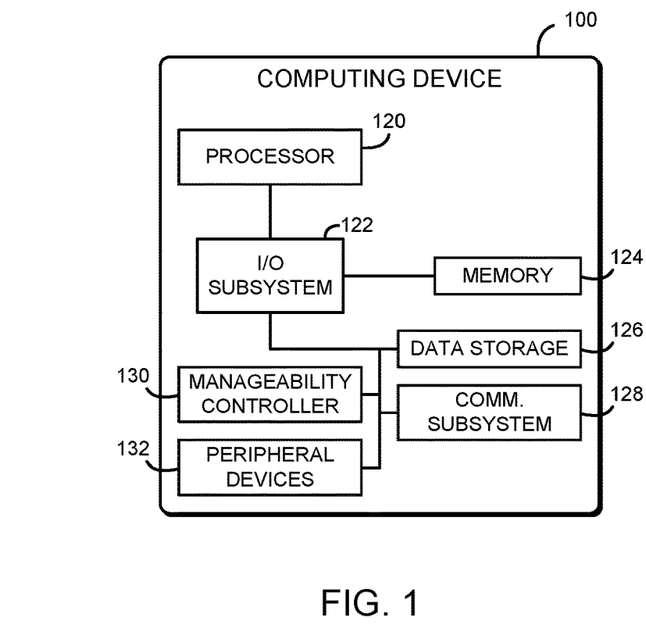
FIG. 1 is a simplified block diagram of at least one embodiment of a computing device for headless server management and autonomous logging.

Referring now to FIG. 1, in an illustrative embodiment, a computing device 100 for headless server manageability and autonomous logging is shown. As shown, the computing device 100 includes a host processor 120 and a manageability controller 130. In use, as described in more detail below, the computing device 100 reserves a frame buffer in main memory for use by a graphics driver. Primary graphics (e.g., operating system graphics, console messages, or other primary output) are rendered to the frame buffer using the graphics driver. The manageability controller 130 may access the graphics data in the frame buffer to provide keyboard, video, and mouse redirection (KVMr) services to one or more remote computing devices. In response to a crash or other fatal error, the manageability controller 130 may log the graphics data in non-volatile storage for later review by an administrator. Thus, the computing device 100 may provide KVMr manageability without requiring dedicated VGA hardware, which may reduce cost and/or complexity of server board components. Additionally, the computing device 100 may improve crash recovery or otherwise improve error troubleshooting by automatically preserving the contents of any error messages or other information displayed by the computing device 100 before the computing device 100 is reset. Crash information may be recorded automatically, without requiring an active KVMr session with a remote console device.

The computing device 100 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, an embedded system, a distributed computing system, a processor-based system, and/or a consumer electronic device. As shown in FIG. 1, the computing device 100 illustratively includes a processor 120, an input/output subsystem 122, a memory 124, a data storage device 126, and a communication subsystem 128. Of course, the computing device 100 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. As described further below, the data storage device 126 may include a partition or other region that is accessible by the manageability controller 130, and/or the manageability controller 130 may access a dedicated non-volatile storage device.

The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include a manageability controller 130 and one or more peripheral devices 132. The manageability controller 130 may be embodied as any hardware component(s) or circuitry capable of providing manageability and security-related services to the computing device 100. In particular, the manageability controller 130 may include a microprocessor, microcontroller, or other embedded controller capable of executing firmware and/or other code independently and securely from the processor 120. For example, the manageability controller 130 may be embodied as a manageability engine (ME), a converged security and manageability engine (CSME), an Intel® innovation engine (IE), a board management controller (BMC), an embedded controller (EC), or other independent controller of the computing device 100. Thus, the manageability controller 130 may be used to establish a trusted execution environment for the computing device 100. The manageability controller 130 may communicate with the processor 120 and/or other components of the computing device 100 over a dedicated bus, such as a host embedded controller interface (HECI). Further, in some embodiments, the manageability controller 130 is also capable of communicating using the communication subsystem 128 or a dedicated communication circuit independently of the state of the computing device 100 (e.g., independently of the state of the main processor 120), also known as "out-of-band" communication. Illustratively, the manageability controller 130 is embodied as an IE incorporated in the I/O subsystem 122; however, in some embodiments, the manageability controller 130 may be included in a system-on-a-chip (SoC) of the computing device 100 or in a different component of the computing device 100, or may be embodied as a separate component.

The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices. Of course, in some embodiments the computing device 100 may be headless, without a physical display or human input devices, and in some embodiments without graphics controller circuitry.

Figure 2:
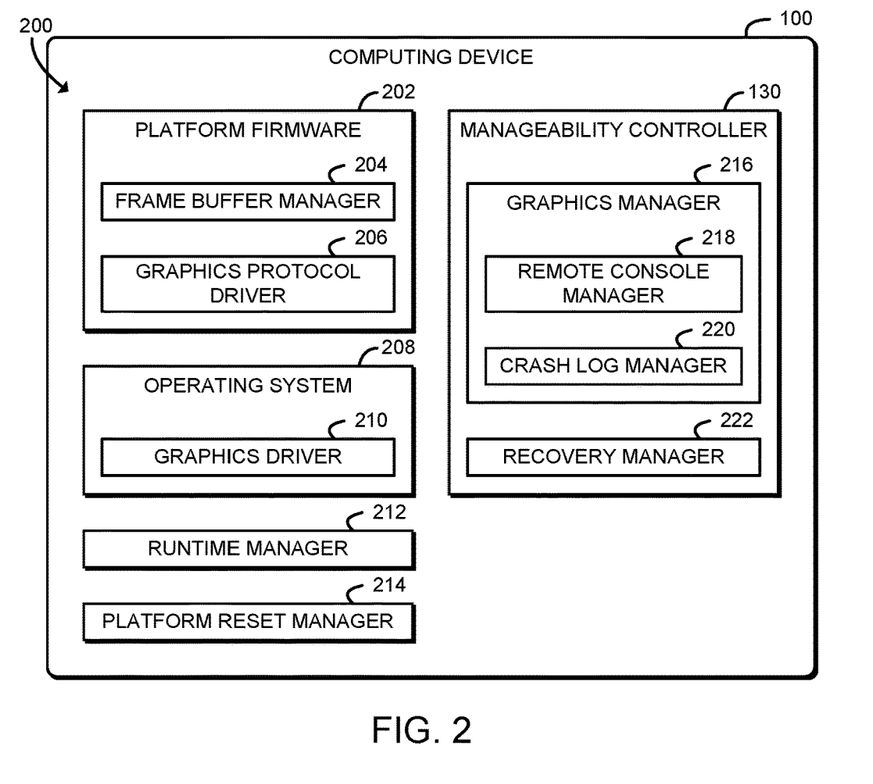
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes platform firmware 202, an operating system 208, a runtime manager 212, a platform reset manager 214, a graphics manager 216, and a recovery manager 222. As shown, the platform firmware 202 further includes a frame buffer manager 204 and a graphics protocol driver 206. The various components of the environment 200 may be embodied as hardware, firmware, software, or a combination thereof. As such, in some embodiments, one or more of the components of the environment 200 may be embodied as circuitry or collection of electrical devices (e.g., frame buffer manager circuitry 204, runtime manager circuitry 212, platform reset manager circuitry 214, graphics manager circuitry 216, and/or recovery manager circuitry 222). It should be appreciated that, in such embodiments, one or more of the frame buffer manager circuitry 204, the runtime manager circuitry 212, the platform reset manager circuitry 214, the graphics manager circuitry 216, and/or the recovery manager circuitry 222 may form a portion of one or more of the processor 120, the I/O subsystem 122, the manageability controller 130, and/or other components of the computing device 100. Additionally, in some embodiments, one or more of the illustrative components may form a portion of another component and/or one or more of the illustrative components may be independent of one another.

The platform firmware 202 may be embodied as a UEFI BIOS firmware, an ACPI BIOS firmware, or other firmware environment executed by the host processor 120 of the computing device 100. The platform firmware 202 may establish a pre-boot firmware execution environment in response to a platform reset of the computing device 100 (e.g., a cold boot, warm boot, or other platform reset). As shown, the platform firmware 202 includes the frame buffer manager 204 and the graphics protocol driver 206.

The frame buffer manager 204 is configured to allocate a frame buffer in the main memory 124 of the computing device 100. The frame buffer manager 204 is further configured to load the graphics protocol driver 206 to provide the frame buffer to the operating system 208. The graphics protocol driver 206 may be embodied as any firmware driver, firmware application, or other component that provides an interface to support rendering graphics to a software frame buffer. For example, the graphics protocol driver 206 may implement a UEFI graphics output protocol (GOP) or other firmware graphics driver interface to provide the frame buffer to the operating system 208.

The operating system 208 may be embodied as any operating system, hypervisor, virtual machine monitor, and/or other component of the computing device 100 that controls the computing device 100 at runtime. At runtime, the operating system 208 may manage execution of one or more applications, system frameworks, drivers, virtual machines, or other workloads executed by the computing device 100. As shown, the operating system 208 includes a graphics driver 210. The graphics driver 210 is configured to output graphics data (e.g., text, graphics, or other graphical user interface data) to the frame buffer. Although illustrated as an operating system 208 component, it should be understood that in some embodiments the graphics driver 210 may be a part of the platform firmware 202.

The runtime manager 212 is configured to load the operating system 208 in response to allocating the frame buffer and loading the graphics protocol driver 206. The runtime manager 212 is further configured to render, by the operating system 208, a graphical image to the frame buffer with the graphics driver 210. The graphical image may include a graphical user interface, text interface, or other primary graphics output of the operating system 208.

As shown, the graphics manager 216 and the recovery manager 222 are established or otherwise executed by the manageability controller 130. The graphics manager 216 is configured to read, by the manageability controller 130, the graphical image from the frame buffer. The manageability controller 130 may perform a direct memory access (DMA) operation to the memory 124 to read the graphical image. In some embodiments, the graphics manager 216 may be further configured to transmit, by the manageability controller 130, the graphical image to a remote computing device via a network connection. In some embodiments, the graphics manager 216 may be further configured to determine, by the manageability controller 130, whether a fatal error of the computing device 100 has occurred. The graphics manager 216 may be further configured to read the frame buffer if a fatal error has occurred and to store the graphical image from the frame buffer in a non-volatile storage device coupled to the manageability controller 130. The graphics manager 216 may be further configured to store, by the manageability controller 130, additional crash information in the non-volatile storage device if a fatal error has occurred. In some embodiments, those functions may be performed by one or more sub-components, such as a remote console manager 218 and/or a crash log manager 220.

The platform reset manager 214 is configured to assert a host reset signal from the host processor 120 to the manageability controller 130 in response to a fatal error of the computing device 100. The platform reset manager 214 is further configured to determine, by the host processor 120, whether an acknowledgment of the host reset signal has been received from the manageability controller 130. The platform reset manager 214 is further configured to reset the computing device 100 by the host processor 120 in response receiving an acknowledgment of the host reset signal from the manageability controller 130.

The recovery manager 222 is configured to determine, by the manageability controller 130, whether the host reset signal has been asserted by the host processor 120. The recovery manager 222 is further configured to send, by the manageability controller 130, an acknowledgment of the host reset signal to the host processor 120 in response to storing the graphical image from the frame buffer in the non-volatile storage. An acknowledgment of the host reset signal may also be sent if a fatal error has not occurred.

Figure 3:
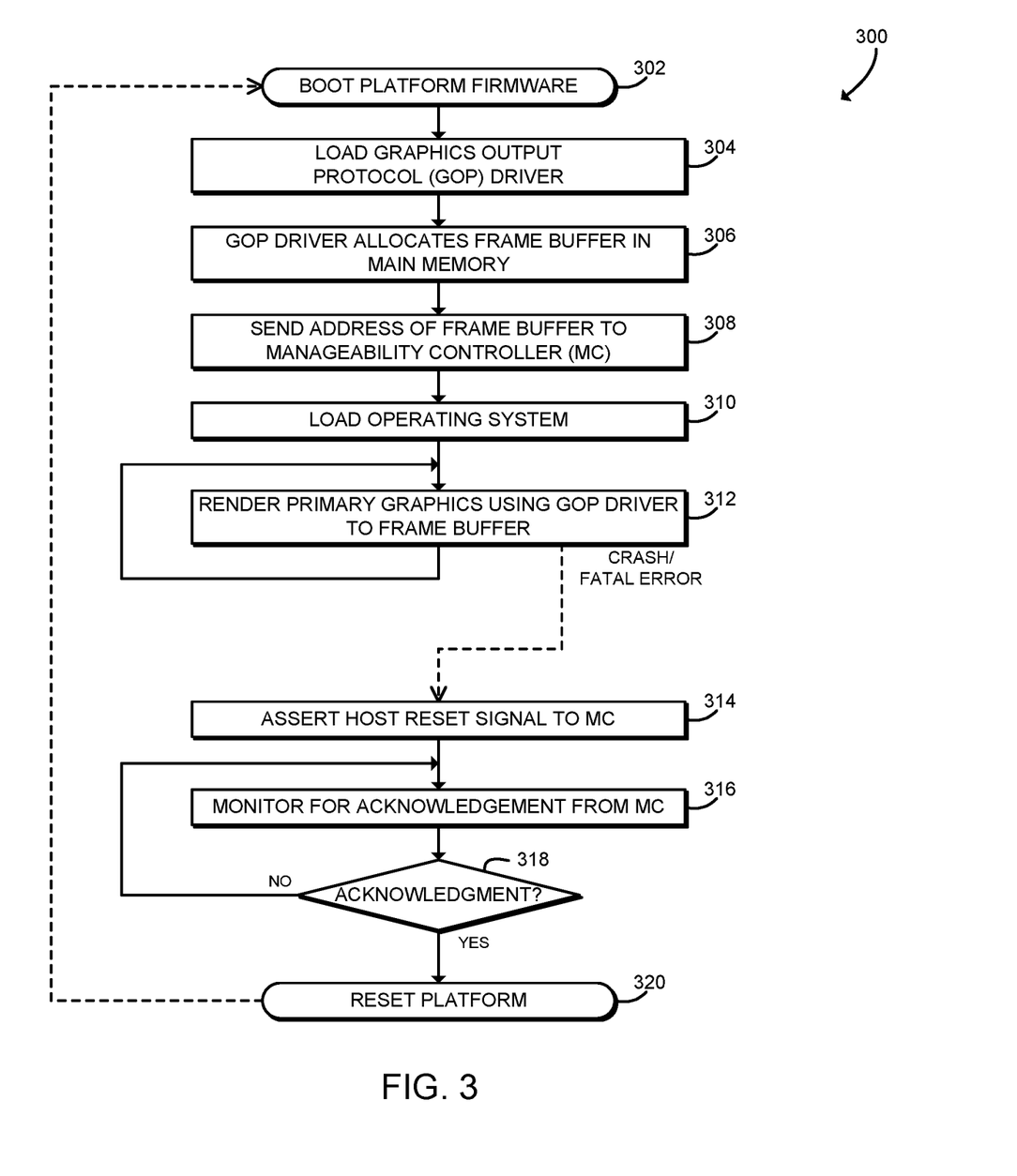
FIG. 3 is a simplified flow diagram of at least one embodiment of a method for manageable server execution that may be executed by the computing device of FIGS. 1-2.

Referring now to FIG. 3, in use, the computing device 100 may execute a method 300 for manageable server execution. In particular, the method 300 may be executed by the processor 120 of the computing device 100. It should be appreciated that, in some embodiments, the operations of the method 300 may be performed by one or more components of the environment 200 of the computing device 100 as shown in FIG. 2. The method 300 begins in block 302, in which the computing device 100 boots into the platform firmware 202. The computing device 100 may boot into the platform firmware 202 in response to a platform reset, for example when initially starting the computing device 100 or in response to a reboot. During boot, the platform firmware 202 may initialize hardware of the computing device 100. The platform firmware 202 may also load one or more firmware drivers and/or firmware applications and otherwise initialize a firmware execution environment.

In block 304, the platform firmware 202 loads a graphics output protocol (GOP) driver 206. The graphics protocol driver 206 may be embodied as any firmware driver or other component that implements the graphics output protocol (GOP) software interface defined by one or more UEFI specifications. In block 306, the GOP driver 206 allocates a frame buffer in the main memory 124 of the computing device 100. The frame buffer may be embodied as a contiguous region of the memory 124. In some embodiments, the platform firmware 202 may reserve the frame buffer for use by the platform firmware 202, preventing the operating system 208 from accessing the frame buffer. For example, the frame buffer may be excluded from a system memory map provided by the platform firmware 202 to the operating system 208. The graphics protocol driver 206 provides the frame buffer in the memory 124 to the operating system 208 using a firmware interface, such as the UEFI GOP interface. As described further below, the operating system 208 may use the frame buffer as a software frame buffer (e.g., as a software BLT buffer to store graphics pixel data). The platform firmware 202 may use the graphics protocol driver 206 as a default graphics output. Additionally or alternatively, although illustrated as a UEFI GOP driver, it should be understood that in other embodiments the graphics protocol driver 206 may implement a different graphics driver interface and/or be part of a different pre-boot environment.

In block 308, the graphics protocol driver 206 sends the address of the frame buffer to the manageability controller 130. The graphics protocol driver 206 and/or other components of the platform firmware 202 may use any technique to send the address to the manageability controller 130. For example, the platform firmware 202 may send the address using a dedicated bus such as a host embedded controller interface (HECI) bus. As another example, the platform firmware 202 may send the address using a network connection.

In block 310, the platform firmware 202 loads the operating system 208. The platform firmware 202 may stop executing a pre-boot firmware environment, for example by calling the ExitBootServices( ) function, and then load the operating system 208. The platform firmware 202 may execute a boot loader or other boot target to load the operating system 208. The graphics protocol driver 206 may be unloaded when boot services are exited and the operating system 208 is loaded.

After loading the operating system 208, in block 312 the computing device 100 renders primary graphics using the graphics driver 210 to the frame buffer in the memory 124. Any graphics generated by the operating system 208, applications, system frameworks, virtual machines, or other workloads executed by the computing device 100 may be directed to the graphics driver 210, which renders the graphics to the frame buffer in the memory 124. Thus, the computing device 100 may generate graphics at runtime without using a dedicated graphics controller or other video hardware. The method 300 loops back to block 312 to continue rendering graphics to the frame buffer during normal operation of the computing device 100.

As shown, in the event of an operating system crash or other fatal error, the method 300 may branch from block 312 to block 314. The computing device 100 may use any technique to detect a crash or fatal error. For example, in some embodiments, the operating system 208 may detect the system crash or fatal error. As another example, in some embodiments, hardware of the processor 120 may detect an error condition. As a further example, a watchdog timer may be used to detect the error condition. In block 314, the computing device 100 asserts a host reset signal to the manageability controller 130. The computing device 100 may use any technique to assert the host reset signal, such as asserting the host reset signal over an electrical connection to the manageability controller 130 and/or asserting the host reset signal with an equivalent connection, such as the HECI bus or a network connection.

In block 316, the computing device 100 monitors for an acknowledgment sent from the manageability controller 130. As described below in connection with FIG. 4, in response to the host reset signal, the manageability controller 130 may store crash information in non-volatile storage or perform other crash recovery operations and then send an acknowledgment when the crash recovery operations are complete. Thus, the manageability controller 130 may delay a platform reset until error messages or other crash-related information are stored in non-volatile storage for later review. In block 318, the computing device 100 determines whether an acknowledgment has been received from the manageability controller 130. If not, the method 300 loops back to block 316 to continue monitoring for an acknowledgement. If an acknowledgement has been received, the method 300 advances to block 320, in which the computing device 100 performs a platform reset. After performing the platform reset, the method 300 may re-start in block 302 and boot the platform firmware 202.

Figure 4:
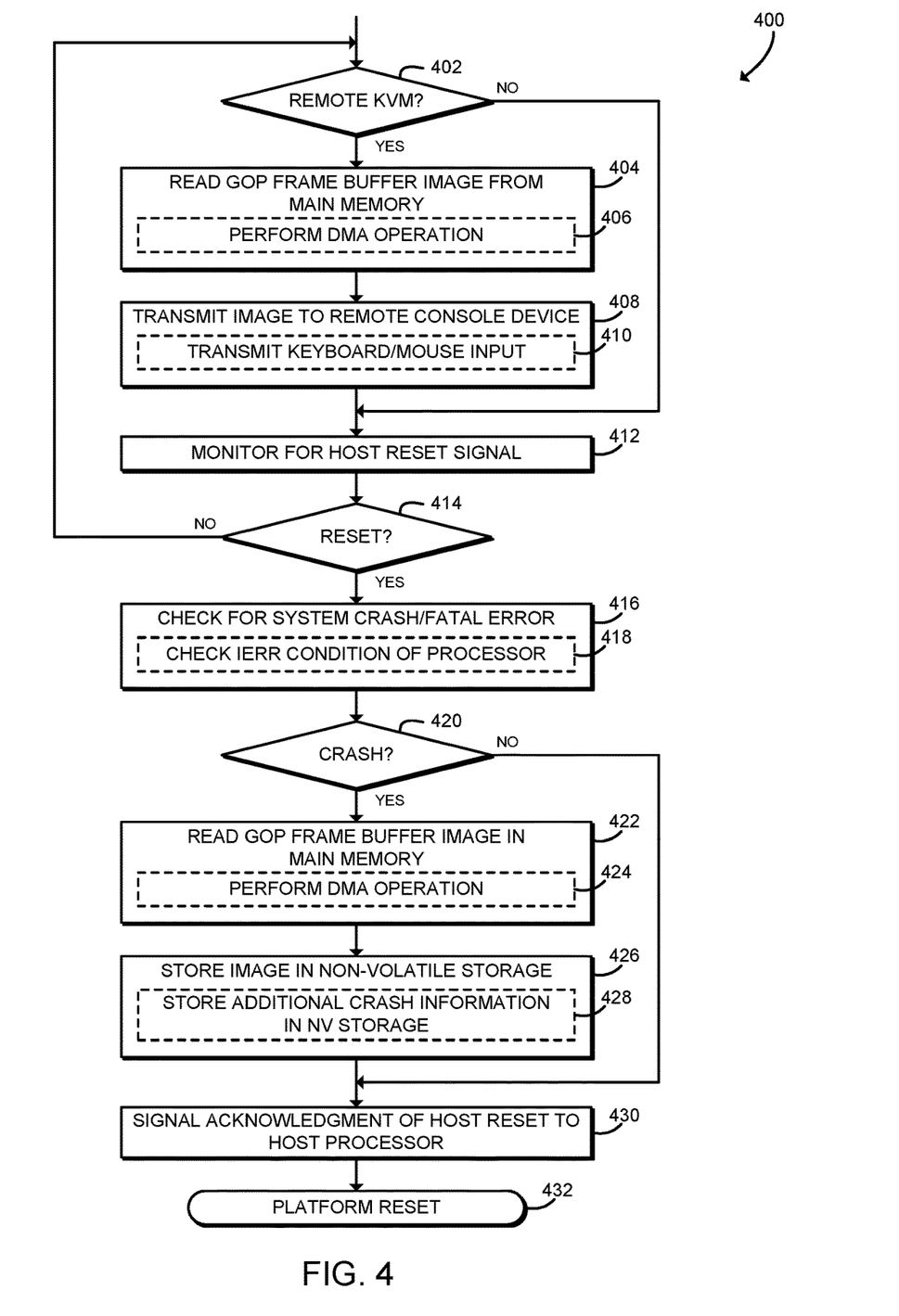
FIG. 4 is a simplified flow diagram of at least one embodiment of a method for server manageability and autonomous logging that may be executed by the computing device of FIGS. 1-2.

Referring now to FIG. 4, in use, the computing device 100 may execute a method 400 for server manageability and autonomous logging. In particular, the method 400 may be executed by the manageability controller 130 of the computing device 100. It should be appreciated that, in some embodiments, the operations of the method 400 may be performed by one or more components of the environment 200 of the computing device 100 as shown in FIG. 2. The method 400 begins in block 402, in which the manageability controller 130 determines whether to perform keyboard, video, and mouse redirection (KVMr). The manageability controller 130 may perform KVMr, for example, when configured to provide remote console access to one or more remote computing devices for system administration or other manageability purposes. If the manageability controller 130 determines not to perform KVMr, the method 400 branches ahead to block 412, described below. If the manageability controller 130 determines to perform KVMr, the method 400 advances to block 404.

In block 404, the manageability controller 130 reads the contents of the frame buffer that was reserved by the graphics protocol driver 206 from the memory 124. As described above in connection with block 306, the frame buffer may be embodied as a region of the memory 124 that has been reserved for use as a frame buffer and is otherwise not accessible by the operating system 208. As described above in connection with block 312, at runtime primary graphics of the computing device 100 are rendered using the graphics driver 210 to the frame buffer. Thus, the frame buffer includes pixel data corresponding to the current primary graphics output of the computing device 100. The manageability controller 130 may use any technique to read the frame buffer data. The frame buffer data may be copied to dedicated memory of the manageability controller 130, such as internal SRAM or an external low-power DRAM module. In some embodiments, in block 406, the manageability controller 130 may perform a direct memory access (DMA) operation to read the contents of the frame buffer. Thus, the manageability controller 130 may read the frame buffer without involvement of the processor 120.

In block 408, the manageability controller 130 transmits the image data read from the frame buffer to one or more remote console devices. The manageability controller 130 may use any remote access protocol (e.g., RFB, VNC, RDP, or other protocol) to transmit the image data. The image data may be transmitted using an out-of-band networking capability of the manageability controller 130 and thus may be transmitted without involvement of the processor 120. In some embodiments, in block 410 the manageability controller 130 may also transmit keyboard and/or mouse input to the one or more remote console devices. Thus, the manageability controller 130 may provide remote control using KVMr for the computing device 100.

In block 412, the manageability controller 130 monitors for a host reset signal received from the processor 120. As described above in connection with block 314 of FIG. 3, the host reset signal may be asserted in response to a system crash or fatal error of the computing device 100. The host reset signal may also be asserted in response to an ordinary platform reset request, such as a user-initiated reboot. As described above, the host reset signal may be asserted using any appropriate technique, such as being asserted over an electrical connection from the processor 120 to the manageability controller 130 and/or being asserted over an equivalent connection, such as the HECI bus or a network connection. In block 414, the manageability controller 130 determines whether a host reset signal has been received. If not, the method 400 loops back to block 402 to continue performing KVMr redirection, if configured. If a host reset signal has been received, the method 400 advances to block 416.

In block 416, the manageability controller 130 checks for a system crash or fatal error. The manageability controller 130 may use any appropriate technique to check for a system crash or fatal error. For example, the manageability controller 130 may determine whether a watchdog timer has expired. In some embodiments, in block 418 the manageability controller 130 may check for an IERR condition of the processor 120. The IERR condition may be set by the processor 120 in response to certain fatal errors, such as certain internal processor error conditions or certain external events. To check the IERR condition of the processor 120, the manageability controller 130 may read one or more registers of the processor 120 over a PECI interface. In block 420, the manageability controller 130 determines whether a crash or fatal error has occurred. If not, the method 400 branches ahead to block 430, described below. If a crash or fatal error has occurred, the method 400 advances to block 422.

In block 422, the manageability controller 130 reads the contents of the frame buffer that was reserved by the graphics protocol driver 206 from the memory 124. As described above, the frame buffer includes pixel data corresponding to the current primary graphics output of the computing device 100. Thus, after a crash or fatal error, the frame buffer may include an error message or other information displayed with the primary graphics at the time of the crash. For example, the frame buffer may include the contents of a "blue screen," a "kernel panic," or other error message displayed by the operating system 208 at the time of the crash. That error information may be useful to a system administrator to determine the cause of the crash. The manageability controller 130 may use any technique to read the frame buffer data. In some embodiments, in block 424, the manageability controller 130 may perform a direct memory access (DMA) operation to read the contents of the frame buffer. Thus, the manageability controller 130 may read the frame buffer without involvement of the processor 120, which may be unusable or in an inconsistent state due to the crash.

In block 426, the manageability controller 130 stores the image data read from the frame buffer into a non-volatile storage device. For example, the manageability controller 130 may store the image data into a flash memory device accessible to the manageability controller 130 (e.g., SPI flash, eMMC flash, NVMe flash, or other non-volatile memory device). After being stored, an administrator or other user may later examine the image data, for example after a platform reset. In some embodiments, in block 428 the manageability controller 130 may also store additional crash information in the non-volatile storage. For example, the manageability controller 130 may store timestamp data or other crash dump data in the non-volatile storage. Additionally or alternatively, although illustrated as storing the image data only in response to a system crash or fatal error, in some embodiments the manageability controller 130 may store the image data before every platform reset. Thus, in those embodiments, image data may be stored even for crash events that are not detectable by the manageability controller 130 (e.g., certain software crashes).

In block 430, the manageability controller 130 signals an acknowledgment of the host reset to the host processor 120. The manageability controller 130 may use any technique to send the acknowledgment, such as sending the acknowledgment over an electrical connection or an equivalent such as the HECI bus or a network connection. After sending the acknowledgment, in block 432 the computing device 100 performs a platform reset. After performing the platform reset, the method 400 may be re-started.

Although illustrated in FIGS. 3 and 4 as performing both KVMr and autonomous crash logging functions, it should be understood that in some embodiments the computing device 100 may perform those functions separately. For example, in some embodiments the computing device 100 may perform KVMr without autonomous crash logging and/or the computing device 100 may perform autonomous crash logging without KVMr.

It should be appreciated that, in some embodiments, the methods 300 and/or 400 may be embodied as various instructions stored on a computer-readable media, which may be executed by the processor 120, the manageability controller 130, and/or other components of the computing device 100 to cause the computing device 100 to perform the respective method 300 and/or 400. The computer-readable media may be embodied as any type of media capable of being read by the computing device 100 including, but not limited to, the memory 124, the data storage device 126, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for system manageability, the computing device comprising: a host processor to execute a firmware environment, the firmware environment comprising a frame buffer manager to (i) allocate a frame buffer in a main memory of the computing device, and (ii) load a graphics protocol driver to provide the frame buffer to an operating system; a runtime manager to (i) load the operating system in response to allocation of the frame buffer and loading of the graphics protocol driver and (ii) render a graphical image to the frame buffer in response to provision of the frame buffer to the operating system; and a manageability controller comprising a graphics manager to read the graphical image from the frame buffer.

Example 2 includes the subject matter of Example 1, and wherein to read the graphical image from the frame buffer comprises to perform a direct memory access operation by the manageability controller.

Example 3 includes the subject matter of any of Examples 1 and 2, and wherein the graphics manager is further to transmit the graphical image to a remote computing device via a network connection.

Example 4 includes the subject matter of any of Examples 1-3, and wherein the graphics manager is further to: determine whether a fatal error of the computing device has occurred; and store the graphical image from the frame buffer in a non-volatile storage device coupled to the manageability controller; wherein to read the graphical image from the frame buffer comprises to read the graphical image from the frame buffer in response to a determination that the fatal error of the computing device has occurred.

Example 5 includes the subject matter of any of Examples 1-4, and wherein to determine whether the fatal error has occurred comprises to determine whether an internal processor error condition of the host processor is set.

Example 6 includes the subject matter of any of Examples 1-5, and wherein the graphics manager is further to store crash information in the non-volatile storage device in response to a determining that the fatal error of the computing device has occurred.

Example 7 includes the subject matter of any of Examples 1-6, and wherein the crash information comprises timestamp information.

Example 8 includes the subject matter of any of Examples 1-7, and further comprising a platform reset manager to: assert a host reset signal from the host processor to the manageability controller in response to the fatal error;

determine whether an acknowledgment of the host reset signal has been received from the manageability controller; and reset the computing device in response to a determination that the acknowledgment of the host reset signal has been received from the manageability controller.

Example 9 includes the subject matter of any of Examples 1-8, and wherein the manageability controller further comprises a recovery manager to: determine whether the host reset signal has been asserted by the host processor; and send an acknowledgment of the host reset signal to the host processor in response to storage of the graphical image from the frame buffer in the non-volatile storage or in response to a determination that a fatal error has not occurred; wherein to determine whether a fatal error has occurred comprises to determine whether a fatal error has occurred in response to a determination that the host reset signal has been asserted.

Example 10 includes the subject matter of any of Examples 1-9, and wherein the manageability controller further comprises a controller for executing firmware independently from the host processor.

Example 11 includes the subject matter of any of Examples 1-10, and wherein the computing device comprises an I/O subsystem, and the I/O subsystem comprises the manageability controller.

Example 12 includes the subject matter of any of Examples 1-11, and wherein the computing device comprises an innovation engine, and the innovation engine comprises the manageability controller.

Example 13 includes a method for system manageability, the method comprising: allocating, by a computing device, a frame buffer in a main memory of the computing device, the computing device comprising a host processor for executing a firmware environment; loading, by the computing device, a graphics protocol driver to provide the frame buffer to an operating system of the computing device; loading, by the computing device, the operating system in response to allocating the frame buffer and loading the graphics protocol driver; rendering, by the computing device, a graphical image to the frame buffer in response to providing the frame buffer to the operating system; and reading, by a manageability controller of the computing device, the graphical image from the frame buffer.

Example 14 includes the subject matter of Example 13, and wherein reading the graphical image from the frame buffer comprises performing a direct memory access operation by the manageability controller.

Example 15 includes the subject matter of any of Examples 13 and 14, and further comprising transmitting, by the manageability controller, the graphical image to a remote computing device via a network connection.

Example 16 includes the subject matter of any of Examples 13-15, and further comprising: determining, by the manageability controller, whether a fatal error of the computing device has occurred; and storing, by the manageability controller, the graphical image from the frame buffer in a non-volatile storage device coupled to the manageability controller; wherein reading the graphical image from the frame buffer comprises reading the graphical image from the frame buffer in response to determining that the fatal error of the computing device has occurred.

Example 17 includes the subject matter of any of Examples 13-16, and wherein determining whether the fatal error has occurred comprises determining whether an internal processor error condition of the host processor is set.

Example 18 includes the subject matter of any of Examples 13-17, and further comprising storing, by the manageability controller, crash information in the non-volatile storage device in response to determining that the fatal error of the computing device has occurred.

Example 19 includes the subject matter of any of Examples 13-18, and wherein the crash information comprises timestamp information.

Example 20 includes the subject matter of any of Examples 13-19, and further comprising: asserting a host reset signal from the host processor to the manageability controller in response to the fatal error; determining whether an acknowledgment of the host reset signal has been received from the manageability controller; and resetting the computing device in response to determining that the acknowledgment of the host reset signal has been received from the manageability controller.

Example 21 includes the subject matter of any of Examples 13-20, and further comprising: determining, by the manageability controller, whether the host reset signal has been asserted by the host processor; and sending, by the manageability controller, an acknowledgment of the host reset signal to the host processor in response to storing the graphical image from the frame buffer in the non-volatile storage or in response to determining that a fatal error has not occurred; wherein determining whether a fatal error has occurred comprises determining whether a fatal error has occurred in response to determining that the host reset signal has been asserted.

Example 22 includes the subject matter of any of Examples 13-21, and wherein the manageability controller further comprises a controller for executing firmware independently from the host processor.

Example 23 includes the subject matter of any of Examples 13-22, and wherein the computing device comprises an I/O subsystem, and the I/O subsystem comprises the manageability controller.

Example 24 includes the subject matter of any of Examples 13-23, and wherein the computing device comprises an innovation engine, and the innovation engine comprises the manageability controller.

Example 25 includes a computing device comprising: a processor; and a memory having stored therein a plurality of instructions that when executed by the processor cause the computing device to perform the method of any of Examples 13-24.

Example 26 includes one or more non-transitory, computer readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for system manageability, the computing device comprising: means for allocating a frame buffer in a main memory of the computing device, the computing device comprising a host processor for executing a firmware environment; means for loading a graphics protocol driver to provide the frame buffer to an operating system of the computing device; means for loading the operating system in response to allocating the frame buffer and loading the graphics protocol driver; means for rendering a graphical image to the frame buffer in response to providing the frame buffer to the operating system; and means for reading, by a manageability controller of the computing device, the graphical image from the frame buffer.

Example 29 includes the subject matter of Example 28, and wherein the means for reading the graphical image from the frame buffer comprises means for performing a direct memory access operation by the manageability controller.

Example 30 includes the subject matter of any of Examples 28 and 29, and further comprising means for transmitting, by the manageability controller, the graphical image to a remote computing device via a network connection.

Example 31 includes the subject matter of any of Examples 28-30, and further comprising: means for determining, by the manageability controller, whether a fatal error of the computing device has occurred; and means for storing, by the manageability controller, the graphical image from the frame buffer in a non-volatile storage device coupled to the manageability controller; wherein the means for reading the graphical image from the frame buffer comprises means for reading the graphical image from the frame buffer in response to determining that the fatal error of the computing device has occurred.

Example 32 includes the subject matter of any of Examples 28-31, and wherein the means for determining whether the fatal error has occurred comprises means for determining whether an internal processor error condition of the host processor is set.

Example 33 includes the subject matter of any of Examples 28-32, and further comprising means for storing, by the manageability controller, crash information in the non-volatile storage device in response to determining that the fatal error of the computing device has occurred.

Example 34 includes the subject matter of any of Examples 28-33, and wherein the crash information comprises timestamp information.

Example 35 includes the subject matter of any of Examples 28-34, and further comprising: means for asserting a host reset signal from the host processor to the manageability controller in response to the fatal error; means for determining whether an acknowledgment of the host reset signal has been received from the manageability controller; and means for resetting the computing device in response to determining that the acknowledgment of the host reset signal has been received from the manageability controller.

Example 36 includes the subject matter of any of Examples 28-35, and further comprising: means for determining, by the manageability controller, whether the host reset signal has been asserted by the host processor; and means for sending, by the manageability controller, an acknowledgment of the host reset signal to the host processor in response to storing the graphical image from the frame buffer in the non-volatile storage or in response to determining that a fatal error has not occurred; wherein the means for determining whether a fatal error has occurred comprises means for determining whether a fatal error has occurred in response to determining that the host reset signal has been asserted.

Example 37 includes the subject matter of any of Examples 28-36, and wherein the manageability controller further comprises a controller for executing firmware independently from the host processor.

Example 38 includes the subject matter of any of Examples 28-37, and wherein the computing device comprises an I/O subsystem, and the I/O subsystem comprises the manageability controller.

Example 39 includes the subject matter of any of Examples 28-38, and wherein the computing device comprises an innovation engine, and the innovation engine comprises the manageability controller.

The invention claimed is:

1. A computing device for system manageability, the computing device comprising:
   a host processor to execute a firmware environment, the firmware environment comprising a frame buffer manager to (i) allocate a frame buffer in a main memory of the computing device, and (ii) load a graphics protocol driver to provide the frame buffer to an operating system;
   a runtime manager to (i) load the operating system in response to allocation of the frame buffer and loading of the graphics protocol driver and (ii) render a graphical image to the frame buffer in response to provision of the frame buffer to the operating system;
   a manageability controller comprising a graphics manager to (i) determine whether a fatal error of the computing device has occurred and (ii) read the graphical image from the frame buffer in response to a determination that the fatal error of the computing device has occurred; and
   a platform reset manager to (i) assert a host reset signal from the host processor to the manageability controller in response to the fatal error, (ii) determine whether an acknowledgment of the host reset signal has been received from the manageability controller, and (iii) reset the computing device in response to a determination that the acknowledgment of the host reset signal has been received from the manageability controller.

2. The computing device of claim 1, wherein to read the graphical image from the frame buffer comprises to perform a direct memory access operation by the manageability controller.

3. The computing device of claim 1, wherein the graphics manager is further to transmit the graphical image to a remote computing device via a network connection.

4. The computing device of claim 1, wherein the graphics manager is further to:
   store the graphical image from the frame buffer in a non-volatile storage device coupled to the manageability controller.

5. The computing device of claim 4, wherein to determine whether the fatal error has occurred comprises to determine whether an internal processor error condition of the host processor is set.

6. The computing device of claim 4, wherein the graphics manager is further to store crash information in the non-volatile storage device in response to a determining that the fatal error of the computing device has occurred.

7. The computing device of claim 6, wherein the crash information comprises timestamp information.

8. The computing device of claim 4, wherein the manageability controller further comprises a recovery manager to:
   determine whether the host reset signal has been asserted by the host processor; and
   send an acknowledgment of the host reset signal to the host processor in response to storage of the graphical image from the frame buffer in the non-volatile storage or in response to a determination that a fatal error has not occurred;
   wherein to determine whether a fatal error has occurred comprises to determine whether a fatal error has occurred in response to a determination that the host reset signal has been asserted.

9. The computing device of claim 1, wherein the manageability controller further comprises a controller for executing firmware independently from the host processor.

10. The computing device of claim 1, wherein the computing device comprises an I/O subsystem, and the I/O subsystem comprises the manageability controller.

11. A method for system manageability, the method comprising:
   allocating, by a computing device, a frame buffer in a main memory of the computing device, the computing device comprising a host processor for executing a firmware environment;
   loading, by the computing device, a graphics protocol driver to provide the frame buffer to an operating system of the computing device;
   loading, by the computing device, the operating system in response to allocating the frame buffer and loading the graphics protocol driver;
   rendering, by the computing device, a graphical image to the frame buffer in response to providing the frame buffer to the operating system;
   determining, by a manageability controller of the computing device, whether a fatal error of the computing device has occurred;
   reading, by the manageability controller, the graphical image from the frame buffer in response to determining that the fatal error of the computing device has occurred;
   asserting a host reset signal from the host processor to the manageability controller in response to the fatal error;
   determining whether an acknowledgment of the host reset signal has been received from the manageability controller; and
   resetting the computing device in response to determining that the acknowledgment of the host reset signal has been received from the manageability controller.

12. The method of claim 11, wherein reading the graphical image from the frame buffer comprises performing a direct memory access operation by the manageability controller.

13. The method of claim 11, further comprising transmitting, by the manageability controller, the graphical image to a remote computing device via a network connection.

14. The method of claim 11, further comprising:
   storing, by the manageability controller, the graphical image from the frame buffer in a non-volatile storage device coupled to the manageability controller.

15. The method of claim 14, further comprising storing, by the manageability controller, crash information in the non-volatile storage device in response to determining that the fatal error of the computing device has occurred.

16. The method of claim 14, further comprising:
   determining, by the manageability controller, whether the host reset signal has been asserted by the host processor; and
   sending, by the manageability controller, an acknowledgment of the host reset signal to the host processor in response to storing the graphical image from the frame buffer in the non-volatile storage or in response to determining that a fatal error has not occurred;
   wherein determining whether a fatal error has occurred comprises determining whether a fatal error has occurred in response to determining that the host reset signal has been asserted.

17. One or more non-transitory, machine-readable storage media comprising a plurality of instructions stored thereon that, in response to being executed, cause a computing device to:
   allocate a frame buffer in a main memory of the computing device, wherein the computing device comprises a host processor for executing a firmware environment;
   load a graphics protocol driver to provide the frame buffer to an operating system;
   load the operating system in response to allocating the frame buffer and loading the graphics protocol driver;
   render a graphical image to the frame buffer in response to providing the frame buffer to the operating system;
   determine, by a manageability controller of the computing device, whether a fatal error of the computing device has occurred;
   read, by the manageability controller, the graphical image from the frame buffer in response to determining that the fatal error of the computing device has occurred;
   assert a host reset signal from the host processor to the manageability controller in response to the fatal error;
   determine whether an acknowledgment of the host reset signal has been received from the manageability controller; and
   reset the computing device in response to determining that the acknowledgment of the host reset signal has been received from the manageability controller.

18. The one or more non-transitory, machine-readable storage media of claim 17, wherein to read the graphical image from the frame buffer comprises to perform a direct memory access operation by the manageability controller.

19. The one or more non-transitory, machine-readable storage media of claim 17, further comprising a plurality of instructions stored thereon that, in response to being executed, cause the computing device to transmit, by the manageability controller, the graphical image to a remote computing device via a network connection.

20. The one or more non-transitory, machine-readable storage media of claim 17, further comprising a plurality of instructions stored thereon that, in response to being executed, cause the computing device to:
   store, by the manageability controller, the graphical image from the frame buffer in a non-volatile storage device coupled to the manageability controller.

21. The one or more non-transitory, machine-readable storage media of claim 20, further comprising a plurality of instructions stored thereon that, in response to being executed, cause the computing device to store, by the manageability controller, crash information in the non-volatile storage device in response to determining that the fatal error of the computing device has occurred.

22. The one or more non-transitory, machine-readable storage media of claim 20, further comprising a plurality of instructions stored thereon that, in response to being executed, cause the computing device to:
   determine, by the manageability controller, whether the host reset signal has been asserted by the host processor; and
   send, by the manageability controller, an acknowledgment of the host reset signal to the host processor in response to storing the graphical image from the frame buffer in the non-volatile storage or in response to determining that a fatal error has not occurred;
   wherein to determine whether a fatal error has occurred comprises to determine whether a fatal error has occurred in response to determining that the host reset signal has been asserted.

* * * * *